(12) United States Patent
Wang et al.

(10) Patent No.: US 12,124,780 B2
(45) Date of Patent: Oct. 22, 2024

(54) POWER ESTIMATION USING INPUT VECTORS AND DEEP RECURRENT NEURAL NETWORKS

(71) Applicant: Synopsys, Inc., Mountain View, CA (US)

(72) Inventors: Chaofan Wang, Santa Clara, CA (US); Vaibhav Jain, Cupertino, CA (US); Shekaripuram Venkatesh, Los Altos, CA (US); Solaiman Rahim, San Francisco, CA (US)

(73) Assignee: Synopsys, Inc., Sunnyvale, CA (US)

( * ) Notice: Subject to any disclaimer, the term of this patent is extended or adjusted under 35 U.S.C. 154(b) by 445 days.

(21) Appl. No.: 17/520,438

(22) Filed: Nov. 5, 2021

(65) Prior Publication Data

US 2022/0138496 A1 May 5, 2022

Related U.S. Application Data

(60) Provisional application No. 63/110,262, filed on Nov. 5, 2020, provisional application No. 63/110,261, filed on Nov. 5, 2020.

(51) Int. Cl.
*G06F 30/337* (2020.01)
*G06F 30/27* (2020.01)
(Continued)

(52) U.S. Cl.
CPC ............. *G06F 30/33* (2020.01); *G06F 30/27* (2020.01); *G06F 18/24137* (2023.01);
(Continued)

(58) Field of Classification Search
None
See application file for complete search history.

(56) References Cited

U.S. PATENT DOCUMENTS 8,458,116 B2 * 6/2013 Lupetini .............. G05B 13/026
716/109
10,867,091 B1 * 12/2020 Oh ........................ G06F 30/331
(Continued)

OTHER PUBLICATIONS

Zhou, et al. "PRIMAL: Power Inference using Machine Learning" DAC '19, Jun. 2-6, 2019, c 2019 Association for Computing Machinery.
(Continued)

*Primary Examiner* — Leigh M Garbowski
(74) *Attorney, Agent, or Firm* — Patterson + Sheridan, LLP

(57) ABSTRACT

A method includes generating a plurality of input vectors based on input signals to an electric circuit, selecting a subset of the plurality of input vectors, and determining a plurality of datapoints based on the selected subset of the plurality of input vectors. Each datapoint of the plurality of datapoints indicates a power consumption of the electric circuit corresponding to an input vector of the selected subset of the input vectors. The method also includes generating, by a processor, a plurality of vector sequences based on the selected subset of the plurality of input vectors. Each vector sequence of the plurality of vector sequences includes a portion of the selected subset of the plurality of input vectors arranged chronologically. The method further includes training a machine learning model based on a first subset of the plurality of vector sequences and a corresponding first subset of the plurality of datapoints.

18 Claims, 11 Drawing Sheets

(51) Int. Cl.
*G06F 30/33* (2020.01)
*G06F 18/2413* (2023.01)
*G06F 30/30* (2020.01)
*G06F 119/06* (2020.01)
*G06N 3/02* (2006.01)
*G06N 3/045* (2023.01)
*G06N 3/08* (2023.01)

(52) U.S. Cl.
CPC ............ *G06F 30/30* (2020.01); *G06F 30/337* (2020.01); *G06F 2119/06* (2020.01); *G06N 3/02* (2013.01); *G06N 3/045* (2023.01); *G06N 3/08* (2013.01)

(56) References Cited

U.S. PATENT DOCUMENTS

| | | | | |
|---|---|---|---|---|
| 11,651,129 B2* | 5/2023 | Wang | ................... | G06F 18/214 |
| | | | | 716/106 |
| 11,657,273 B2* | 5/2023 | Chen | ..................... | G06N 3/049 |
| | | | | 706/12 |
| 2007/0276645 A1* | 11/2007 | Veller | .................... | G06F 30/33 |
| | | | | 703/18 |
| 2022/0083900 A1* | 3/2022 | Khanna | ................. | G06F 17/18 |

OTHER PUBLICATIONS

Zhang, et al., "GRANNITE: Graph Neural Network Inference for Transferable Power Estimation" © 2020 IEEE.

Yang, et al. "Early Stage Real-Time SoC Power Estimation Using RTL Instrumentation" © 2015 IEEE.

Chung. et al. "A Recurrent Latent Variable Model for Sequential Data" Submitted on Jun. 7, 2015.

Wu, et al., "Offline EEG-Based Driver Drowsiness Estimation Using Enhanced Batch-Mode Active Learning (EBMAL) for Regression" 2016 IEEE.

Dongrui Wu, "Pool-Based Sequential Active Learning for Regression" May 12, 2018.

* cited by examiner

POWER ESTIMATION USING INPUT VECTORS AND DEEP RECURRENT NEURAL NETWORKS

CROSS-REFERENCE TO RELATED APPLICATIONS

This application claims priority to and the benefit of U.S. Provisional Patent Application Ser. No. 63/110,261, entitled "Power Estimation Using Input Vectors and Deep Recurrent Neural Network Model," filed Nov. 5, 2020 and U.S. Provisional Patent Application Ser. No. 63/110,262, entitled "Selecting a Small Subset of Training Data from a Large Data Pool for a Power Prediction Model," filed Nov. 5, 2020, both of which are incorporated herein by reference in their entirety.

TECHNICAL FIELD

The present disclosure generally relates to an electronic design automation (EDA) system. In particular, the present disclosure relates to a system and method for providing power estimation using input vectors and deep recurrent neural networks.

BACKGROUND

A design process of an electric circuit includes estimating the power consumption of the electric circuit. If an electric circuit consumes more power than desired, then the design for the electric circuit should be changed to reduce its power consumption. Typical processes of determining or estimating power consumption use simulations based on input and internal register-transfer level (RTL) nodes of the electric circuit to analyze the activity at the input signals and internal nodes of the electric circuit. Also, the number of cycles of the simulation are becoming increasingly large, even running up to billions of cycles. Under these circumstances, the amount of information to be analyzed becomes very large (and in some instances, prohibitively large) for complex circuits. Thus, such processes are not scalable.

SUMMARY

According to an embodiment, a method includes generating a plurality of input vectors based on input signals to an electric circuit, selecting a subset of the plurality of input vectors, and determining a plurality of datapoints based on the selected subset of the plurality of input vectors. Each datapoint of the plurality of datapoints indicates a power consumption of the electric circuit corresponding to an input vector of the selected subset of the plurality of input vectors. The method also includes generating, by a processor, a plurality of vector sequences based on the selected subset of the plurality of input vectors. Each vector sequence of the plurality of vector sequences includes a portion of the selected subset of the plurality of input vectors arranged chronologically. The method further includes training a machine learning model based on a first subset of the plurality of vector sequences and a corresponding first subset of the plurality of datapoints.

The method may include reducing a dimension of the plurality of vector sequences using principle component analysis or multiple correspondence analysis.

The method may include dividing the plurality of vector sequences and the plurality of datapoints into the first subset of the plurality of vector sequences, the corresponding first subset of the plurality of datapoints, a second subset of the plurality of vector sequences, and a corresponding second subset of the plurality of datapoints. The method may also include validating the machine learning model using the second subset of the plurality of vector sequences and the corresponding second subset of the plurality of datapoints.

The method may include monitoring a validation error while training the machine learning model and stopping the training of the model when the validation error is not reduced after some epochs of the training.

The machine learning model may be a Long Short-Term Memory model.

The machine learning model may be a Gated Recurrent Unit model.

Each input vector of the selected subset of the plurality of input vectors may include values of the input signals to the electric circuit over a cycle period of the electric circuit.

A vector sequence of the plurality of vector sequences may include an internal vector generated based on an internal signal of the electric circuit.

According to another embodiment, a computer system includes a memory and a hardware processor communicatively coupled to the memory. The hardware processor generates a plurality of input vectors based on input signals to an electric circuit, selects a subset of the plurality of input vectors, and determines a plurality of datapoints based on the selected subset of the plurality of input vectors. Each datapoint of the plurality of datapoints indicates a power consumption of the electric circuit corresponding to an input vector of the selected subset of the plurality of input vectors. The hardware processor also generates a plurality of vector sequences based on the selected subset of the plurality of input vectors. Each vector sequence of the plurality of vector sequences includes a portion of the selected subset of the plurality of input vectors arranged chronologically. The hardware processor further trains a machine learning model based on a first subset of the plurality of vector sequences and a corresponding first subset of the plurality of datapoints.

The hardware processor may reduce a dimension of the plurality of vector sequences using principle component analysis or multiple correspondence analysis.

The hardware processor may divide the plurality of vector sequences and the plurality of datapoints into the first subset of the plurality of vector sequences, the corresponding first subset of the plurality of datapoints, a second subset of the plurality of vector sequences, and a corresponding second subset of the plurality of datapoints.

The hardware processor may validate the machine learning model using the second subset of the plurality of vector sequences and the corresponding second subset of the plurality of datapoints.

The hardware processor may monitor a validation error while training the machine learning model and stop the training of the model when the validation error is not reduced after some epochs of the training.

The machine learning model may be a Long Short-Term Memory model.

The machine learning model may be a Gated Recurrent Unit model.

Each input vector of the selected subset of the plurality of input vectors may include values of the input signals to the electric circuit over a cycle period of the electric circuit.

A vector sequence of the plurality of vector sequences may include an internal vector generated based on an internal signal of the electric circuit.

According to another embodiment, a method may include generating a plurality of input vectors based on input signals to an electric circuit and generating, by a processor, a plurality of vector sequences based on the plurality of input vectors. The method may also include applying a machine learning model to the plurality of vector sequences to predict a power consumption of the electric circuit.

The machine learning model may be a Long Short-Term Memory model.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to fast register-transfer level (RTL) power estimation using input vectors and a deep recurrent neural network model. Determining or estimating the power consumption of an electric circuit is important in the design process of the electric circuit. Typical processes for determining power consumption, however, are not scalable due to the amount of information (e.g., a system examines activity and behavior such as toggles, state, and timing at the input nodes and a large number of internal RTL/gate-level nodes of the circuit and for a large number of simulation cycles) that these processes analyze to determine power consumption. This disclosure describes processes for determining power consumption that applies machine learning techniques to the input signals of a circuit.

A machine learning model is trained to predict the power consumption of an electric circuit based on the inputs of the electric circuit. The machine learning model is trained using the power consumption of an electric circuit and vector sequences representing chronologically ordered inputs of the electric circuit when the power consumption was measured. After an iteration of training (referred to as an "epoch"), the machine learning model is tested or verified to evaluate its performance. The iterations of training continue until the performance of the machine learning model stops improving. The trained machine learning model may then be applied to the inputs of an electric circuit to predict the circuit's power consumption.

In certain embodiments, because the process analyzes the input signals to the circuit and not the behavior of the internal nodes of the circuit, there is a significant reduction in the amount of information analyzed to estimate power consumption, which results in a significant speed improvement (e.g., over 10,000×) for larger and more complex designs. Additionally, the processes described herein may also be applied to solve other similar RTL/gate-level simulation problems, like toggle rate prediction. For example, the machine learning model may be trained to predict the toggle rate prediction by adjusting the training dataset to include the toggle rate prediction in addition to or as an alternative to the measured power consumption. In some embodiments, the process excludes the behavior of internal nodes of the circuit from consideration when predicting power consumption. In other embodiments, the process considers some behavior of the internal nodes when predicting power consumption to improve accuracy while maintaining the speed and efficiency of the training process within acceptable limits.

Figure 1:
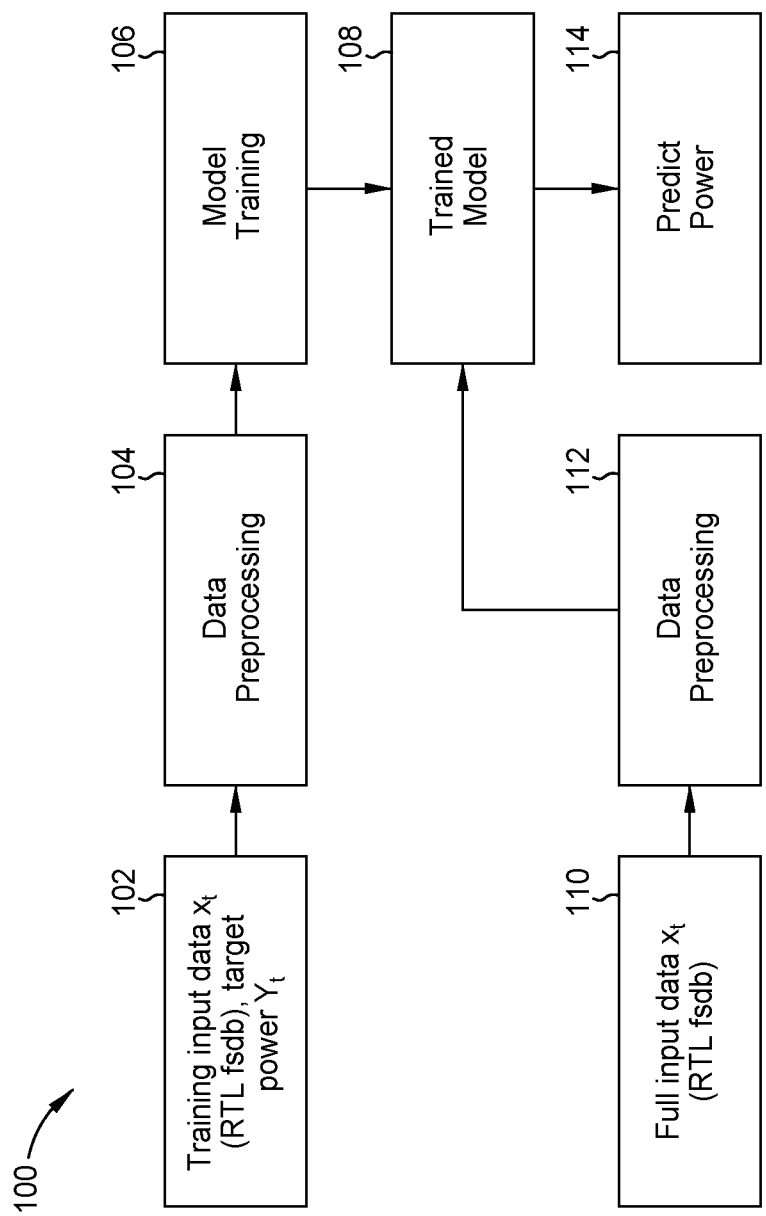
FIG. 1 illustrates a process for estimating the power consumption of an electric circuit based on a machine learning or deep learning approach, in accordance with some embodiments of the present disclosure.
Figure 8:
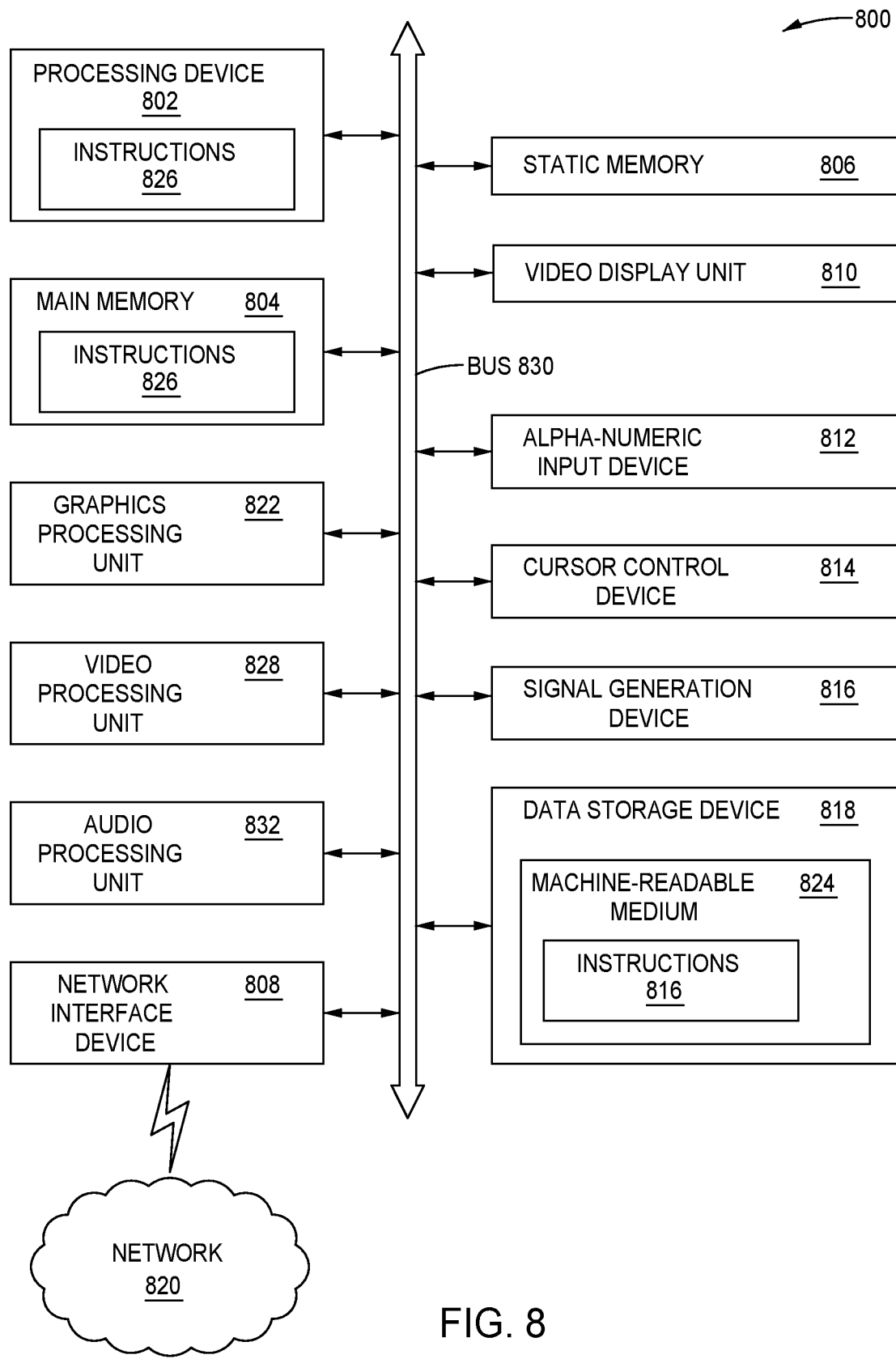
FIG. 8 depicts a diagram of an example computer system in which embodiments of the present disclosure may operate.

FIG. 1 illustrates a process for estimating the power consumption of an electric circuit, in accordance with some embodiments of the present disclosure. A computer system 800 as shown in FIG. 8 may perform the steps of a process 100, as seen and described with respect to FIGS. 1 through 5. For clarity, the computer system is not illustrated in FIGS. 1 through 5. In some embodiments, the computer system applies a machine learning model to the RTL activities of input vectors rather than internal nodes to predict power consumption. The number of input nodes (usually few hundreds or thousands) is typically far less than the number of internal nodes (can be ~100 k or ~millions). As a result, applying the machine learning model to the input vectors can address both space and time complexity issues while remaining independent of internal design, no matter how big the design is.

The process 100 includes a training portion and a prediction portion. During the training portion, a machine learning model is trained to predict power consumption. During the prediction portion, the machine learning model is applied to predict the power consumption of a circuit.

The training portion includes 102, 104, and 106 and produces a trained model 108. At 102, a computer system captures input signals to an electric circuit at select set of cycles (e.g., a clock period) to generate an input vector $(x_t)$ at time t (here t denotes the various select times). The input vector at time t $(x_t)$ is a vector of the binary values (e.g., 0 or 1) of the input signals at the input nodes of the electric circuit at time t. For example, if the electric circuit has ten input nodes which have the values [1, 0, 1, 1, 0, 0, 0, 1, 1, 1] at time t, then the input vector $(x_t)$ is a ten-dimension vector of [1, 0, 1, 1, 0, 0, 0, 1, 1, 1]. The input nodes of the electric circuit are different from the internal nodes of the electric circuit, which are the nodes inside the design of the electric circuit. Additionally, the computer system determines the power consumption $(Y_t)$ of the electric circuit at the selected set of cycles. In some embodiments, the computer system trains a machine learning model to predict power consumption using these input vectors ($x_t$) and the determined power consumption ($Y_t$). In such embodiments, the computer system trains a machine learning model to predict power consumption based on the input vectors ($x_t$) instead of the vectors at the input and the internal nodes of the electric circuit. Because the number of input nodes is typically much smaller than the number of internal nodes, there is a significant reduction in the amount of information analyzed to estimate power consumption, which results in a speed improvement of over 10,000× for large and complex designs, in certain embodiments. Additional details for 102 are provided with respect to FIG. 2.

At 104, the computer system processes the input vectors ($x_t$) to form vector sequences ($X_t$). Generally, each vector sequence ($X_t$) represents a chronological sequence of input vectors ($x_t$) ending at a time (t). Additionally, these vector sequences ($X_t$) are paired with corresponding power consumption ($Y_t$) determined in 102. The pairs of vector sequences ($X_t$) and power consumption ($Y_t$) are then divided into training and validation sets. Additional details for 104 are provided with respect to FIG. 3.

At 106, the computer system uses the training set from 104 to train a machine learning model to predict power consumption. Then, the computer system uses the validation set from 104 to validate the machine learning model. The validation set is used by early stopping technique of machine learning training to reduce overfit. After the validation process, then the machine learning model is considered the trained model 108. In the early stopping process, as long as the validation error keeps reducing after each epoch (one epoch entails shuffling the training dataset and splitting the entire training dataset into several small batches and feeding all the batches into the neural network), the computer system performs another round of training (epoch) on the model. The computer system will shuffle and then re-divide the training set into training batches (batch means small subset of training data that is fed into the neural network model) for each epoch. The computer system then trains (further updates) the machine learning model using the new training batches and further validates the machine learning model. This process repeats until the early stopping condition is triggered (validation error is not further reduced). Additional details for 106 are provided with respect to FIGS. 4A, 4B, and 4C.

The prediction portion of the process 100 includes 110, 112, and 114. At 110, the computer system processes the input signals of an electric circuit to generate input vectors ($x_t$), similar to 102. In 112, the computer system processes the input vectors ($x_t$) to generate vector sequences ($X_t$), similar to 104. At 114, the computer system inputs the vector sequences ($X_t$) into the trained model 108, and the trained model 108 predicts a power consumption ($Y_{test}$) for the electric circuit. Additional details for 110, 112, and 114 are provided with respect to FIG. 5.

The selected input cycles from which the input vectors ($x_t$) are formed may be a small subset (e.g., a randomly chosen subset) of the simulation cycles of the electric circuit or electric circuit design. For example, if 1,000,000 cycles are simulated, 1,000 cycles (0.1% of the cycles) may be selected for forming the input vectors ($x_t$). As a result, the number of datapoints (power consumptions) acquired by simulation is reduced, which saves simulation time and speeds up the model training process.

In certain embodiments, the machine learning model is a recurrent neural network (RNN) model, such as a Long Short-Term Memory (LSTM) or Gated Recurrent Unit (GRU) model, which takes a sequence of input vectors for prediction (the sequence window length is usually 20 cycles) under the assumption that the power consumption of a circuit is dependent on the current state of all RTL internal nodes, which is further a function of the sequence of input vectors. Therefore, the power consumption should be dependent on the sequence of input vectors.

In some embodiments, the computer system augments the input vectors ($x_t$) with some internal node vectors representing internal node values of the electric circuit. The vector sequences ($X_t$) may include some of these internal node vectors. As a result, the computer system trains the machine learning model using the input vectors ($x_t$) and some internal node vectors. The computer system may determine the number of internal vectors to use during training by balancing the desire for accuracy and efficiency. For example, augmenting the input vectors ($x_t$) with more internal node vectors may improve the accuracy of the trained machine learning model while slowing down the training and prediction processes because more internal nodes increase the input feature dimension and therefore the model complexity. As another example, augmenting the input vectors ($x_t$) with fewer internal node vectors may speed up the training process while reducing the accuracy of the trained machine learning model. In some embodiments, the computer system may gradually increase or decrease the number of internal node vectors to use depending on the accuracy of the model. For example, if the computer system determines that the accuracy of the model is far below a desired threshold, the computer system begins increasing the number of internal node vectors used to train the model to improve the accuracy of the model. When the accuracy of the model begins approaching the threshold, the computer system stops increasing the number of internal node vectors. As another example, if the computer system determines that the accuracy of the model far exceeds a desired threshold accuracy, the computer system begins decreasing the number of internal node vectors used to train the model. When the accuracy of the model begins approaching the threshold accuracy, the computer system stops decreasing the number of internal node vectors.

Figure 2:
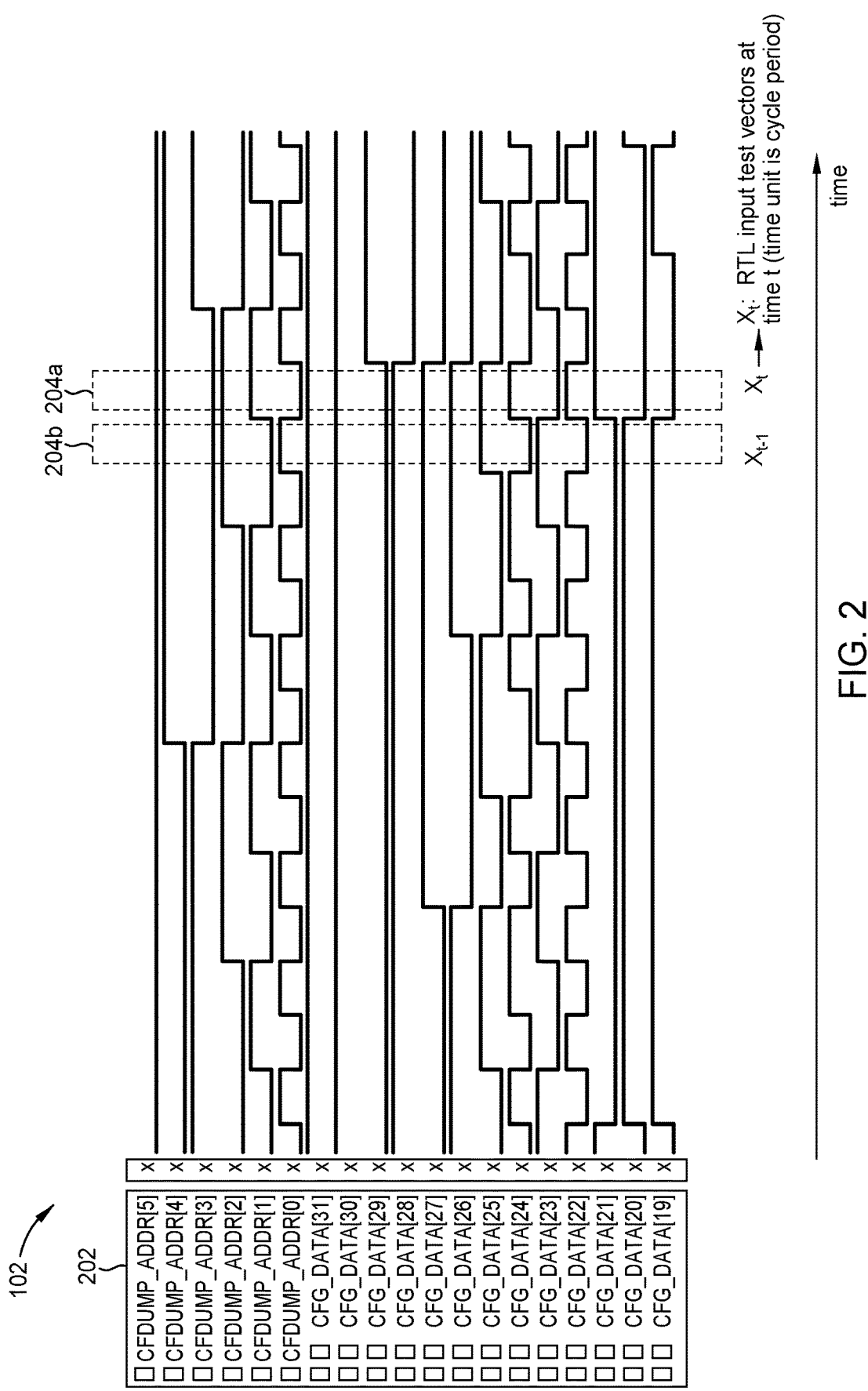
FIG. 2 illustrates generating input vectors, in accordance with some embodiments of the present disclosure.

FIG. 2 illustrates the generation of input vectors ($x_t$), in accordance with some embodiments of the present disclosure. As seen in FIG. 2, the computer system captures input signals 202 to an electric circuit at a select clock period to produce input vectors 204. Each input signal 202 has a waveform that changes over time. In the example of FIG. 2, the computer system captures the input signals 202 at a time t to produce an input vector 204a ($x_t$) and at a time t−1 to produce an input vector 204b ($x_{t-1}$). In certain embodiments, the length of time t is a cycle period of the electric circuit. Additionally, as seen in FIG. 2, the input vector may include the values for any number of inputs to the electric circuit. For example, the input vector may include values for input address lines (e.g., CFDUMP_ADDR[0]-CFDUMP_ADDR[5]) and input data lines (e.g., CFG_DATA[19]-[31]) of the electric circuit.

Additionally, and as seen in FIG. 1, during 102, a simulation may be used to determine the power consumption ($Y_t$) of the electric circuit for a corresponding ($x_t$). These power consumption determinations may result in a series of datapoints representing the determined power consumption ($Y_t$). The processed input vectors ($x_t$) and corresponding power consumption ($Y_t$) may be subsequently used to train a machine learning model. As a result, the machine learning model is trained to predict the power consumption of the electric circuit based on the values of the inputs (e.g., input address lines and input data lines) of the electric circuit over time.

In some embodiments, the computer system also captures some internal node vectors representing internal node values of the electric circuit at times t and t−1. For example, the computer system 800 may measure or determine the values of the internal nodes of the electric circuit at times t and t−1. These determined values then form the internal node vectors at times t and t−1. The computer system may subsequently use these internal node vectors, along with the input vectors ($x_t$ and $x_{t-1}$) and the determined power consumption ($Y_t$) to train the machine learning model.

Figure 3:
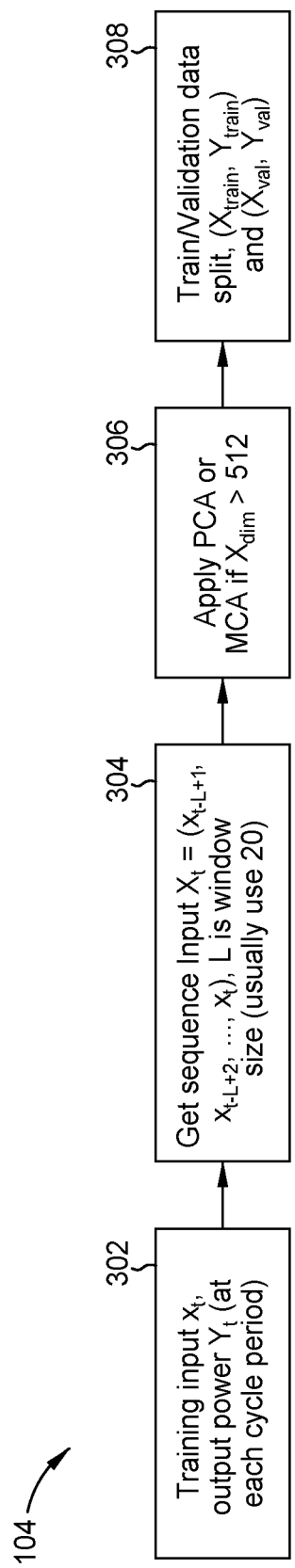
FIG. 3 illustrates processing input vectors, in accordance with some embodiments of the present disclosure.

FIG. 3 illustrates the processing of input vectors ($x_t$) to form vector sequences ($X_t$), in accordance with some embodiments of the present disclosure. FIG. 3 provides additional description of data preprocessing as described in 104 and 112. At 302, the computer system receives the input vectors ($x_t$) and the determined power consumption ($Y_t$) that were generated during 102. At 304, the computer system 800 processes the input vectors ($x_t$) to generate vector sequences ($X_t$). Each vector sequence ($X_t$) includes an input vector ($x_t$) and a number of preceding input vectors. The number of input vectors ($x_t$) in a vector sequence ($X_t$) is referred to as the window size (L). For example, a vector sequence ($X_t$) with a window size (L) includes the input vectors ($x_{t-L+1}$, $x_{t-L+2}$, . . . , $x_{t-1}$, $x_t$). As a result, a vector sequence ($X_t$) includes a chronological sequence of L input vectors. The computer system may generate any suitable number of vector sequences ($X_t$) with any suitable window size (L). The window size may be set by a user of the computer system. In some embodiments, the window size is a default setting.

At 306, the computer system performs principle component analysis (PCA) or multiple correspondence analysis (MCA) if the dimensionality of the input vector (e.g., the number of input nodes) exceeds a threshold (e.g., 512). As a result, the dimensionality of the vector sequences ($X_t$) may be reduced without significantly impacting the performance of the machine learning model, but greatly increasing training speed. In certain embodiments, 306 is an optional step that is not performed.

At 308, the computer system splits (e.g., randomly splits) the pairs of vector sequences ($X_t$) and corresponding power consumptions ($Y_t$) into a training set ($X_{train}$, $Y_{train}$) and a validation set ($X_{val}$, $Y_{val}$). The computer system uses the training set ($X_{train}$, $Y_{train}$) to train the machine learning model. The computer system then uses the validation set ($X_{val}$, $Y_{val}$) to validate the machine learning model.

In some embodiments, the vector sequences ($X_t$) include internal vectors representing internal node values of the electric circuit in addition to the input vectors ($x_t$). As with the input vectors ($x_t$), the vector sequences ($X_t$) may include chronological sequences of the internal vectors with the same window size (L). Additionally, the computer system may apply PCA or MCA to reduce the dimensionality of the internal vectors. Moreover, when the computer system divides the vectors sequences ($X_t$) into the training and validation sets, these sets may include the internal vectors.

Figure 4A:
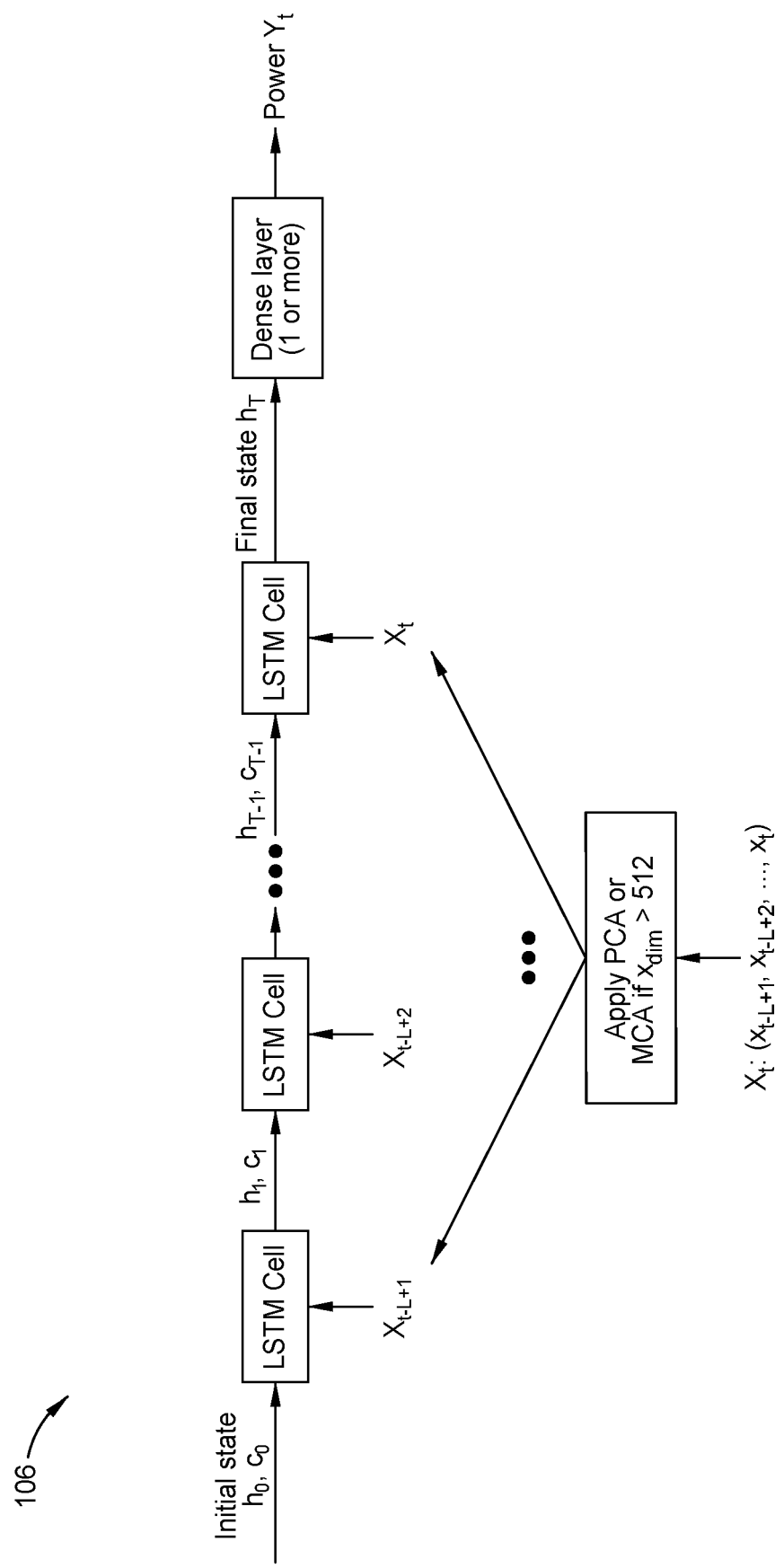
FIGS. 4A, 4B, and 4C illustrate training and validating a machine learning model, in accordance with some embodiments of the present disclosure.
Figure 4B:
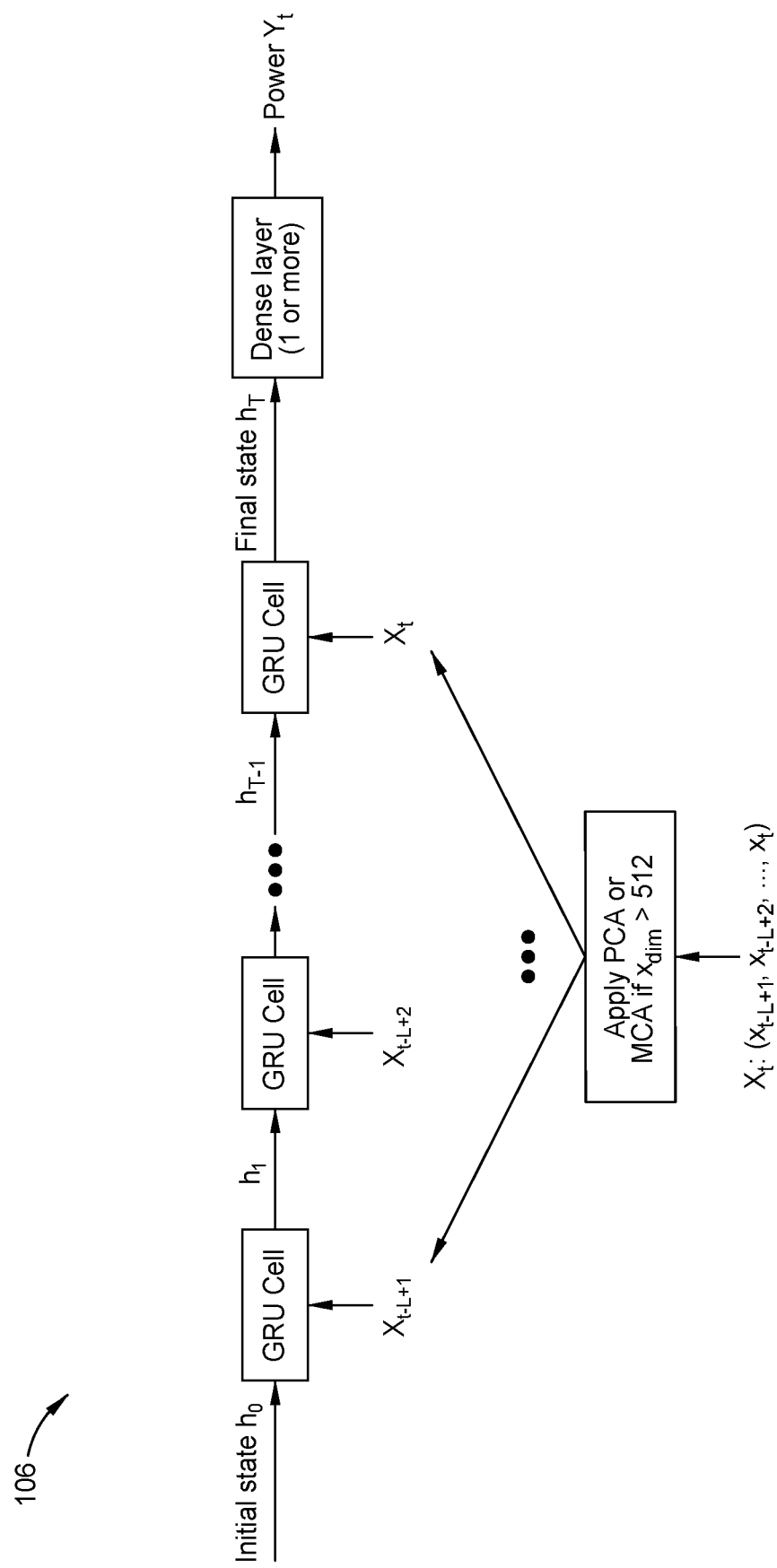
Figure 4C:
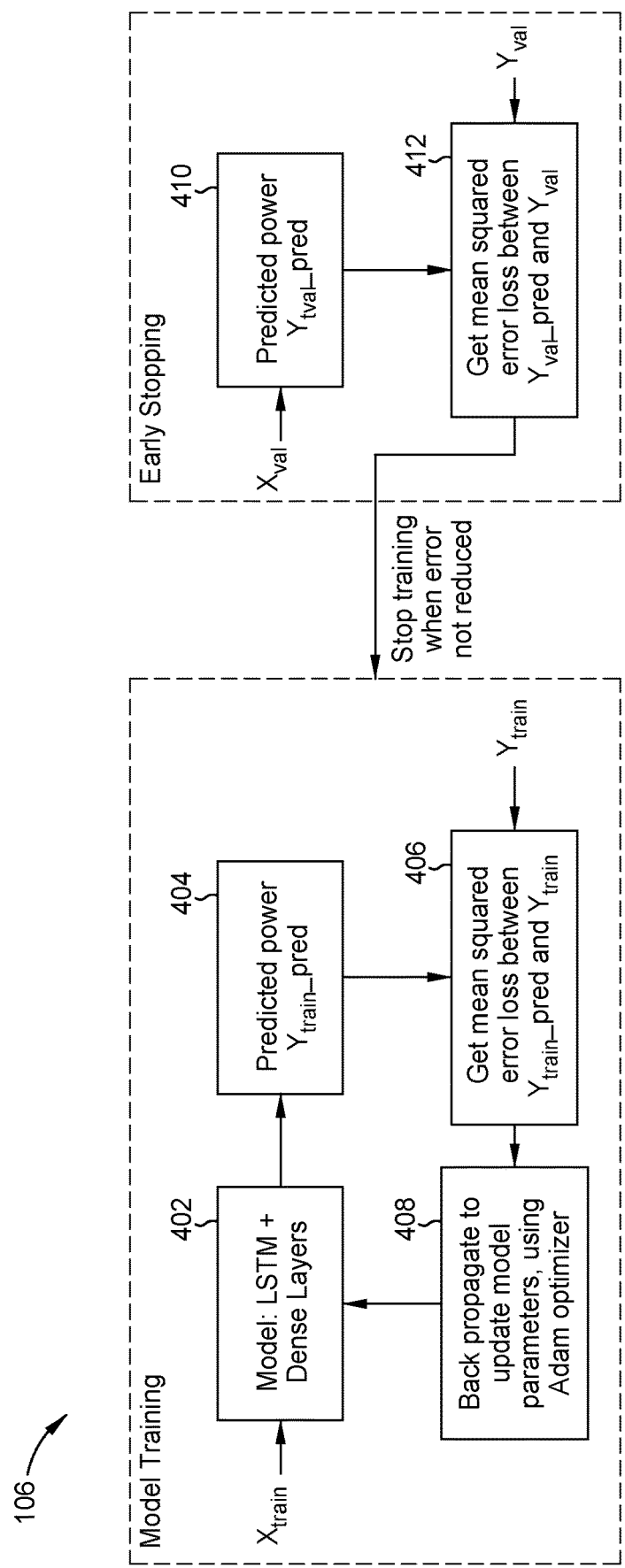

FIGS. 4A, 4B, and 4C illustrate the training and validation of a machine learning model, in accordance with some embodiments of the present disclosure. Generally, the computer system trains the machine learning model using the training set ($X_{train}$, $Y_{train}$) from 308. After training with the training set ($X_{train}$, $Y_{train}$), the computer system determines whether the machine learning model needs additional training by validating the machine learning model using the validation set ($X_{val}$, $Y_{val}$).

As seen in FIG. 4A, the computer system sends the input vectors ($x_t$) of a vector sequence ($X_t$) through a LSTM model. The LSTM model includes multiple LSTM cells that track the state ($h_t$, $c_t$) of the electric circuit based on the sequence of input vectors ($x_t$). After the LSTM model analyzes the input vectors ($x_t$) of the vector sequence ($X_t$) to determine a final state ($h_T$), one or more final neural layers (e.g., Dense layer with nonlinear activation) predicts the power consumption of the circuit ($Y_t$). The following formulas may be used by the LSTM model:

$$i_t = \sigma(W_i x_t + U_i h_{t-1} + b_i)$$
$$f_t = \sigma(W_f x_t + U_f h_{t-1} + b_f)$$
$$o_t = \sigma(W_o x_t + U_o h_{t-1} + b_o)$$
$$g_t = \tanh(W_g x_t + U_g h_{t-1} + b_g)$$
$$c_t = f_t \circ c_{t-1} + i_t \circ g_t$$
$$h_t = o_t \circ \tanh(c_t)$$

$x_t$: input at time t
$h_t$: hidden state at time t
$c_t$: cell state at time t
$i_t$: input gate at time t
$f_t$: forget gate at time t
$o_t$: output gate at time t
$g_t$: cell gate at time t
$W_i$, $U_i$, $b_i$: input gate parameters
$W_f$, $U_f$, $b_f$: forget gate parameters
$W_o$, $U_o$, $b_o$: output gate parameters
$W_g$, $U_g$, $b_g$: cell gate parameters
$\sigma$: sigmoid function
$\circ$: element-wise product FIG. 4B illustrates a different embodiment of training the machine learning model. As seen in FIG. 4B, the machine learning model may be a GRU model. The computer system sends the input vectors ($x_t$) of a vector sequence ($X_t$) through the GRU model. The GRU model includes multiple GRU cells that track the state ($h_t$) of the electric circuit based on the sequence of input vectors ($x_t$). After the GRU model analyzes the input vectors ($x_t$) of the vector sequence ($X_t$) to determine a final state ($h_T$), one or more final neural layers (e.g., Dense layer with nonlinear activation) predicts the power consumption of the circuit ($Y_t$). The following formulas may be used by the GRU model:

$$z_t = \sigma(W_z x_t + U_z h_{t-1} + b_z)$$
$$r_t = \sigma(W_r x_t + U_r h_{t-1} + b_r)$$
$$n_t = \tanh(W_n x_t + r_t \circ (U_n h_{t-1}) + b_n)$$
$$h_t = (1 - z_t) \circ n_t + z_t \circ h_{t-1}$$

$x_t$: input at time t
$h_t$: hidden state at time t
$z_t$: update gate at time t
$r_t$: reset gate at time t
$n_t$: new gate at time t
$W_z$, $U_z$, $b_z$: update gate parameters
$W_r$, $U_r$, $b_r$: reset gate parameters
$W_n$, $U_n$, $b_n$: new gate parameters
$\sigma$: sigmoid function
$\circ$: element-wise product FIG. 4C illustrates the model training and model validation processes, in accordance with some embodiments of the present disclosure. As seen on the left side of FIG. 4C, the computer system 800 begins model training by inputting a training set vector sequence ($X_{train}$) into a machine learning model (e.g., an LSTM model or a GRU model) at 402. The machine learning model predicts a power consumption of the circuit ($Y_{train\_pred}$) based on the training set vector sequence ($X_{train}$) at 404. At 406, the computer system compares the corresponding training set power consumption ($Y_{train}$) with the predicted power consumption ($Y_{train\_pred}$) to determine a difference between them (e.g., the mean squared error loss). At 408, the computer system updates the parameters of the machine learning model based on the mean squared error loss and an optimization technique (e.g., using an Adam optimizer). After training through one epoch, the model starts to test on the validation set ($X_{val}$, $Y_{val}$) with early stopping technique. If the validation error is reduced, the computer system then repeats 402, 404, 406, and 408 for the next epoch with shuffled training set ($X_{train}$, $Y_{train}$). During each epoch, the training set is divided into batches to keep the training process manageable (e.g., fit into RAM) as it is difficult or computationally expensive to train the LSTM/GRU models with the entire training dataset in one stroke.

The computer system then validates the machine learning model to determine whether additional training is needed. As seen on the right side of FIG. 4C, the computer system begins model validation by using the machine learning model to predict a power consumption ($Y_{val\_pred}$) of the circuit based on a validation set vector sequence ($X_{val}$) at 410. The computer system then determines a difference/error (e.g., the mean squared error loss) between the predicted power consumption ($Y_{val\_pred}$) and the validation set power consumption ($Y_{val}$) at 412. The computer system then determines whether the machine learning model needs further training or is finished with early stopping technique (e.g., to check if the validation error is further reduced or not). The machine learning model will stop training if the validation error is not further reduced after one or more epochs (e.g., a preset patience number). The validation metric is not limited to only mean squared loss (MSE), but can be other metrics of interest including, but not limited to mean absolute percentage error (MAPE), and mean absolute error (MAE).

As discussed above, in certain embodiments, to perform another round (epoch) of training, the computer system re-shuffles the training set ($X_{train}$, $Y_{train}$) before feeding the re-shuffled training set ($X_{train}$, $Y_{train}$)' into the model. The computer system then trains the machine learning model using the new shuffled training set ($X_{train}$, $Y_{train}$)' and validates the machine learning model using the same validation set ($X_{val}$, $Y_{val}$). This process repeats until the early stopping condition is triggered. Note that the training and the validation dataset remain the same all through the training and validation process. The shuffling of the training samples during each epoch leads to updates to the LSTM/GRU models.

Figure 5:
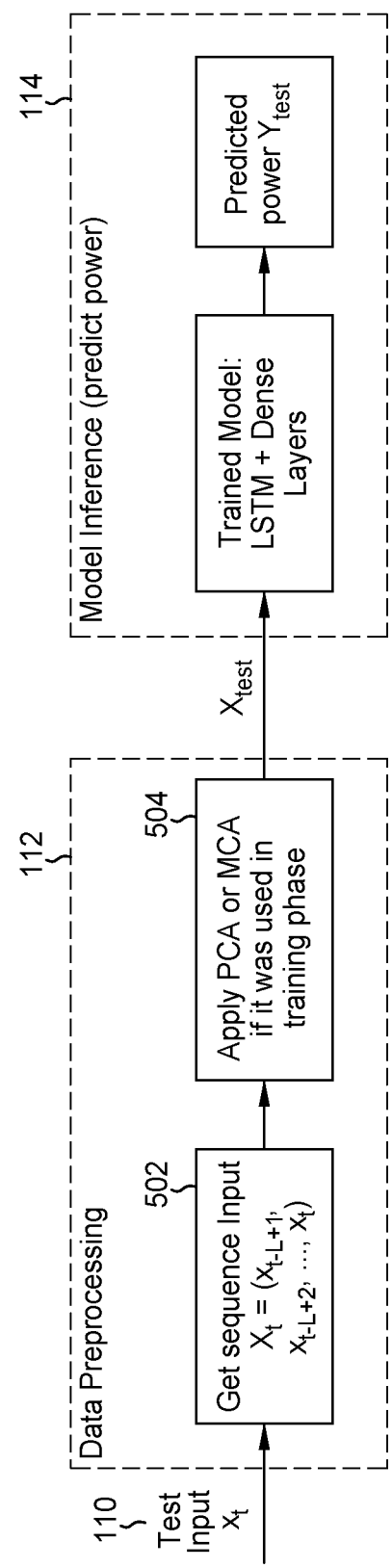
FIG. 5 illustrates using a machine learning model to predict power consumption, in accordance with some embodiments of the present disclosure.

FIG. 5 illustrates using a machine learning model to predict power consumption, in accordance with some embodiments of the present disclosure. As seen in FIG. 5, the computer system generates input vectors ($x_t$) based on the input signals to an electric circuit from 110. This process may be similar to 102 as described in FIGS. 1 and 2. At 112, the computer system processes the input vectors ($x_t$) to produce a test set of vector sequences ($X_{test}$). Specifically, in 502, the computer system processes the input vectors ($x_t$) to generate vector sequences ($X_t$). This process may be similar to 104 as described in FIGS. 1 and 3. At 504, the computer system applies PCA or MCA if PCA or MCA was used during the training phase in 306. As discussed above, PCA or MCA may not be required if the dimensionality of the input vector does not exceed a threshold (e.g., 512).

At 114, the computer system predicts the power consumption ($Y_{test}$) of the circuit based on the test set of vector sequences ($X_{test}$). Specifically, the computer system uses the trained model 108 (e.g., a LSTM or GRU model) to predict the power consumption ($Y_{test}$) of the circuit based on the test set of vector sequences ($X_{test}$). The term "test" may refer to any particular sequence of vectors that is applied to the design.

Figure 6:
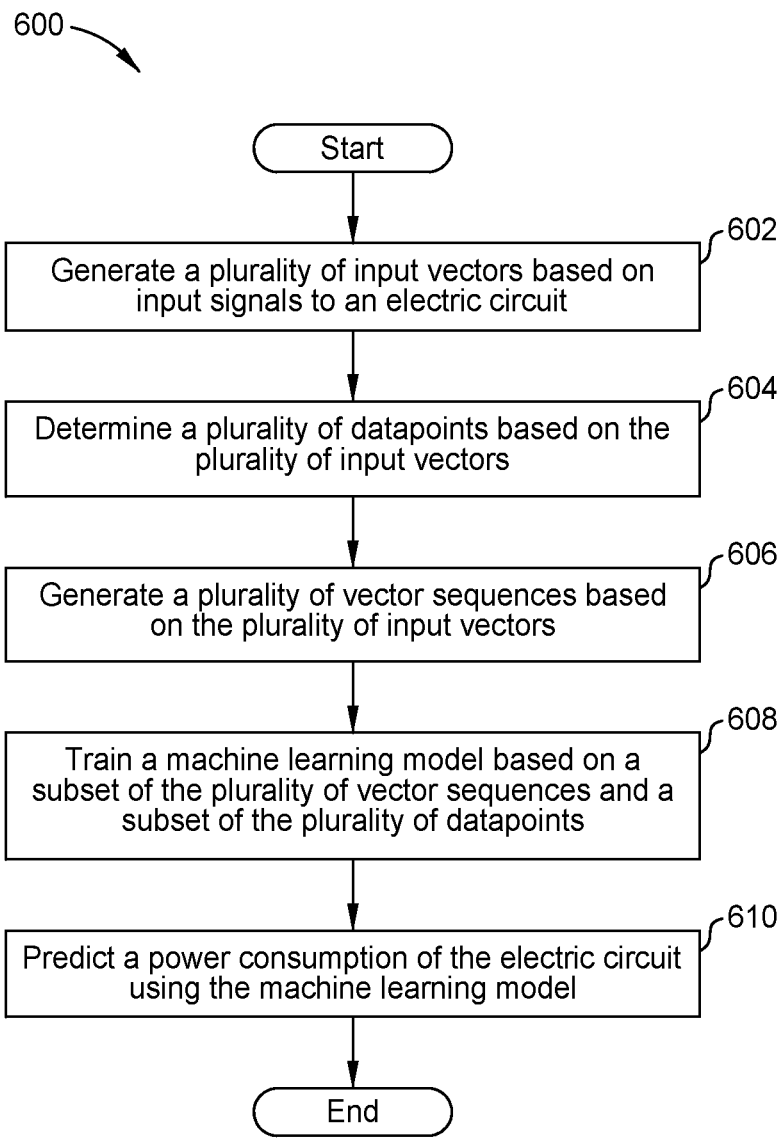
FIG. 6 is a flowchart of a method for training a machine learning model and using the trained model for prediction, in accordance with some embodiments of the present disclosure.

FIG. 6 is a flowchart of a method 600 for training a machine learning model. In particular embodiments, the computer system 800 performs the steps of the method 600. By performing the method 600, a machine learning model for predicting power consumption of an electric circuit is quickly and efficiently trained relative to training processes that consider both input signals and the behavior of the internal nodes of an electric circuit. The training also may be limited to a small fraction of randomly selected cycles. Subsequently, the machine learning model predicts power for the rest of the cycles. This provides significant speed up in the overall power estimation of the full set of cycles.

At 602, a computer system generates a plurality of input vectors 204 ($x_t$) based on input signals 202 to an electric circuit. The computer system may capture the input signals to the electric circuit to generate the input vectors 204 ($x_t$). The input vectors 204 ($x_t$) may include the values of the input signals to the electric circuit over a cycle period of the electric circuit. At 604, the computer system determines a plurality of datapoints based on the plurality of input vectors. Each datapoint may indicate a power consumption ($Y_t$) of the electric circuit corresponding to an input vector 204 ($x_t$). The computer system may generate the datapoints by simulating the electric circuit using the input vectors 204 ($x_t$). The plurality of the input vectors ($x_t$) may be a randomly selected small subset of all the cycles of the design simulation.

At 606, the computer system generates a plurality of vector sequences ($X_t$) based on the plurality of input vectors 204 ($x_t$). The vector sequences ($X_t$) may each include a subset of the plurality of input vectors 204 ($x_t$) arranged chronologically. The number of input vectors 204 ($x_t$) in a vector sequence ($X_t$) may be determined based on a window size (L).

At 608, the computer system trains a machine learning model based on a subset of the vector sequences ($X_{train}$) and a subset of the datapoints ($Y_{train}$). The computer system may divide the plurality of vector sequences ($X_t$) into a training set of vector sequences ($X_{train}$) and a validation set of vector sequences ($X_{val}$). The computer system uses the training set of vector sequences ($X_{train}$) and the training set of datapoints ($Y_{train}$) to train the machine learning model. After the machine learning model is trained, the computer system may use the validation set of vector sequences ($X_{val}$) and the validation set of datapoints ($Y_{val}$) to validate the machine learning model. If the machine learning model is validated, then the machine learning model is considered a trained model 108. At 610, the computer system predicts, using the machine learning model (e.g., the trained model 108), a power consumption of the electric circuit.

Figure 7:
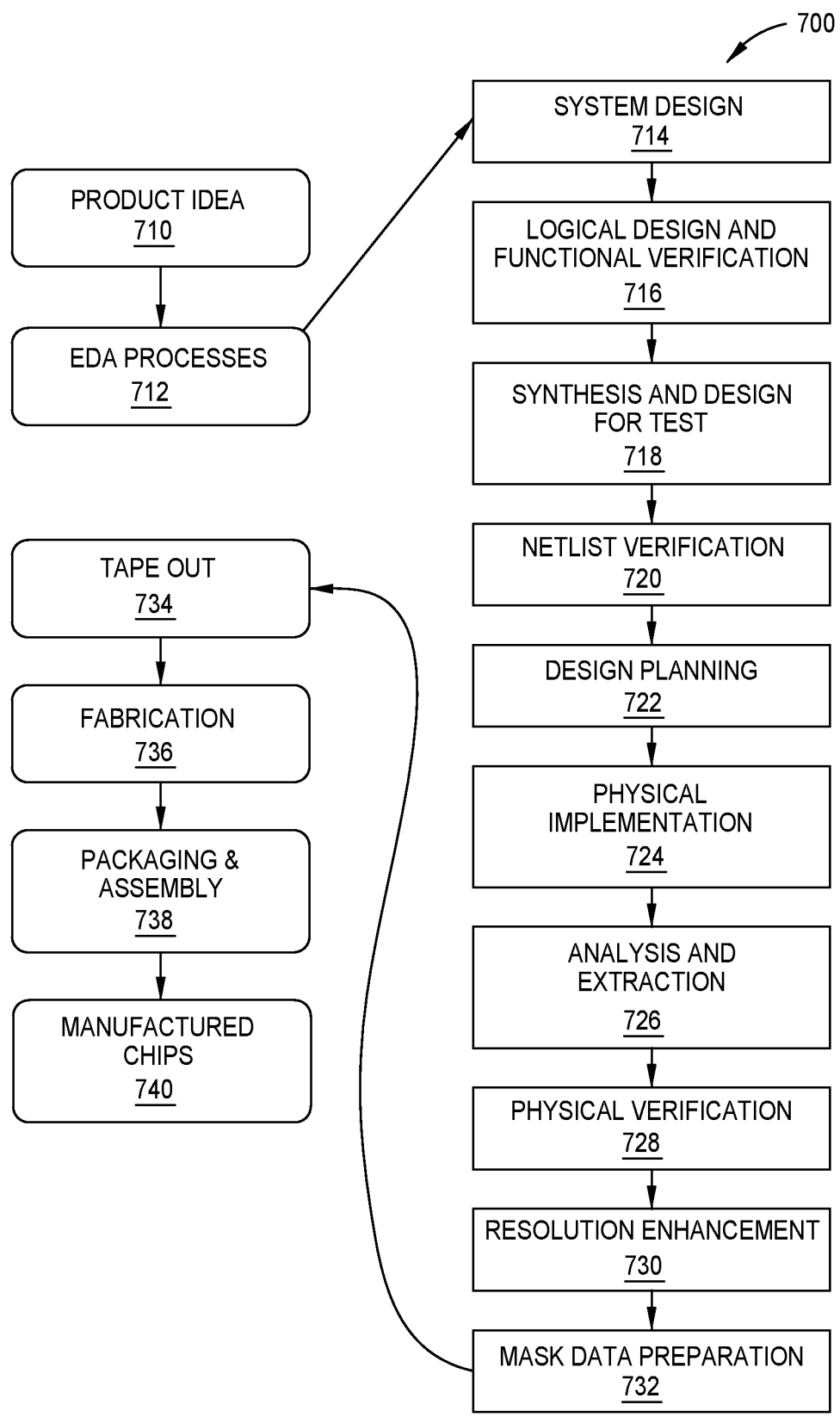
FIG. 7 depicts a flowchart of various processes used during the design and manufacture of an integrated circuit, in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create a article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7.

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Figure 9:
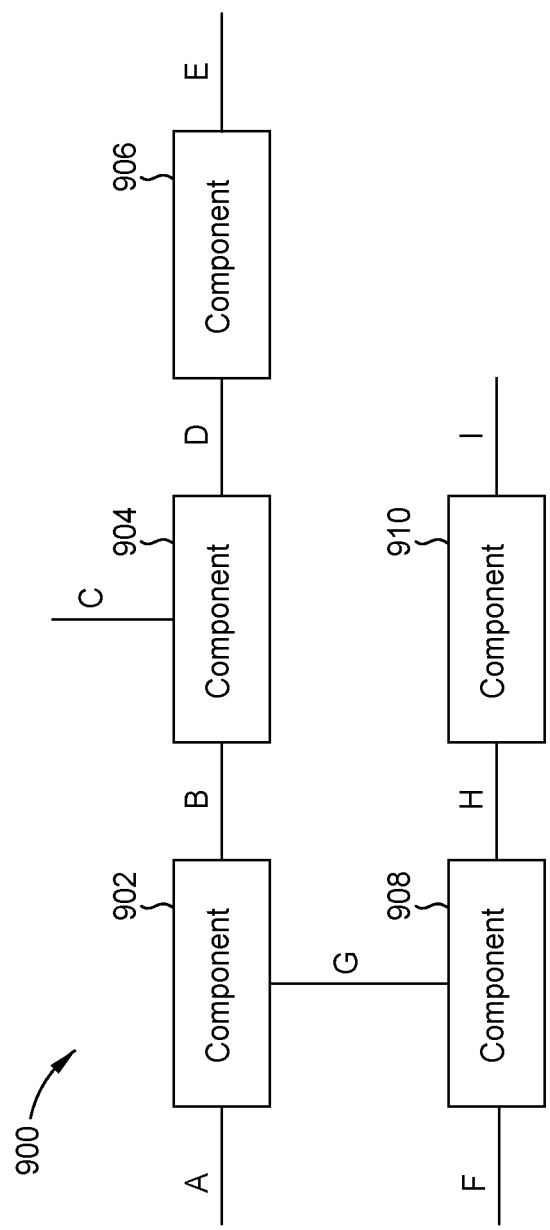
FIG. 9 illustrates an example electric circuit, in accordance with some embodiments of the present disclosure.

FIG. 9 illustrates an example electric circuit 900, in accordance with certain embodiments of the present disclosure. As seen in FIG. 9, the electric circuit 900 includes components 902, 904, 906, 908, and 910. The components 902, 904, 906, 908, and 910 may be any suitable circuit components (e.g., transistors, registers, flops, gates, resistors, capacitors, inductors, etc.). Additionally, the electric circuit 900 includes multiple nodes A, B, C, D, E, F, G, H, and I. The nodes A, C, and F are input nodes to the electric circuit 900. Input signals to the electric circuit 900 are provided to the components 902, 904, and 908 at the nodes A, C, and F, respectively. The nodes E and I are output nodes to the electric circuit 900. The electric circuit 900 produces output signals at the nodes E and I. The nodes B, D, G, and H are internal nodes of the electric circuit 900. The node B connects the components 902 and 904. The node D connects the components 904 and 906. The node G connects the components 902 and 908. The node H connects the components 908 and 910.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
generating a plurality of input vectors, wherein each input vector of the plurality of input vectors indicates values of input signals provided to input ports of an electric circuit during a cycle period of the electric circuit;
generating a plurality of datapoints by simulating, for each input vector of the plurality of input vectors, the electric circuit to determine a power consumption of the electric circuit when the values of the input signals indicated by that input vector are input to the electric circuit;
generating, by a processor, a plurality of vector sequences by generating, for each input vector of the plurality of input vectors, a vector sequence comprising that input vector and a set of input vectors arranged chronologically according to times when that input vector and the set of input vectors were generated, wherein the set of input vectors were generated prior to that input vector, and wherein the vector sequence corresponds to the power consumption of the electric circuit for that input vector; and
training a machine learning model based on a first subset of the plurality of vector sequences and a first subset of the plurality of datapoints corresponding to the first subset of the plurality of vector sequences.

2. The method of claim 1, further comprising reducing a dimension of the plurality of vector sequences using principal component analysis or multiple correspondence analysis.

3. The method of claim 1, further comprising dividing the plurality of vector sequences and the plurality of datapoints into the first subset of the plurality of vector sequences, the corresponding first subset of the plurality of datapoints, a second subset of the plurality of vector sequences, and a corresponding second subset of the plurality of datapoints.

4. The method of claim 3, further comprising validating the machine learning model using the second subset of the plurality of vector sequences and the corresponding second subset of the plurality of datapoints.

5. The method of claim 1, further comprising:
monitoring a validation error while training the machine learning model; and
stopping the training of the machine learning model when the validation error is not reduced after some epochs of the training.

6. The method of claim 1, wherein the machine learning model is a Long Short-Term Memory model.

7. The method of claim 1, wherein the machine learning model is a Gated Recurrent Unit model.

8. The method of claim 1, wherein a vector sequence of the plurality of vector sequences comprises an internal vector generated based on an internal signal of the electric circuit.

9. A computer system comprising:
a memory; and
a hardware processor communicatively coupled to the memory, the hardware processor configured to:
generate a plurality of input vectors, wherein each input vector of the plurality of input vectors indicates values of input signals provided to input ports of an electric circuit during a cycle period of the electric circuit;
generate a plurality of datapoints by simulating, for each input vector of the plurality of input vectors, the electric circuit to determine a power consumption of the electric circuit when the values of the input signals indicated by that input vector are input to the electric circuit;
generate a plurality of vector sequences by generating, for each input vector of the plurality of input vectors, a vector sequence comprising that input vector and a set of input vectors arranged chronologically according to times when that input vector and the set of input vectors were generated, wherein the set of input vectors were generated prior to that input vector, and wherein the vector sequence corresponds to the power consumption of the electric circuit for that input vector; and
train a machine learning model based on a first subset of the plurality of vector sequences and a corresponding first subset of the plurality of datapoints corresponding to the first subset of the plurality of vector sequences.

10. The computer system of claim 9, wherein the hardware processor is further configured to reduce a dimension of the plurality of vector sequences using principal principle component analysis or multiple correspondence analysis.

11. The computer system of claim 9, wherein the hardware processor is further configured to divide the plurality of vector sequences and the plurality of datapoints into the first subset of the plurality of vector sequences, the corresponding first subset of the plurality of datapoints, a second subset of the plurality of vector sequences, and a corresponding second subset of the plurality of datapoints.

12. The computer system of claim 11, wherein the hardware processor is further configured to validate the machine learning model using the second subset of the plurality of vector sequences and the second subset of the plurality of datapoints.

13. The computer system of claim 9, wherein the hardware processor is further configured to:
monitor a validation error while training the machine learning model; and
stop training the machine learning model when the validation error is not reduced after some epochs of the training.

14. The computer system of claim 9, wherein the machine learning model is a Long Short-Term Memory model.

15. The computer system of claim 9, wherein the machine learning model is a Gated Recurrent Unit model.

16. The computer system of claim 9, wherein a vector sequence of the plurality of vector sequences comprises an internal vector generated based on an internal signal of the electric circuit.

17. A method comprising:
generating a plurality of input vectors, wherein each input vector of the plurality of input vectors indicates values of input signals provided to input ports of an electric circuit during a cycle period of the electric circuit;
generating, by a processor, a plurality of vector sequences by generating, for each input vector of the plurality of input vectors, a vector sequence comprising that input vector and a set of input vectors arranged chronologically according to times when that input vector and the set of input vectors were generated, wherein the set of input vectors were generated prior to that input vector, and wherein the vector sequence corresponds to power consumption of the electric circuit for that input vector; and applying a machine learning model to the plurality of vector sequences to predict a power consumption of the electric circuit.

18. The method of claim 17, wherein the machine learning model is a Long Short-Term Memory model.

* * * * *